United States Patent
Kötzing et al.

(10) Patent No.: US 9,475,729 B2
(45) Date of Patent: Oct. 25, 2016

(54) METHOD FOR THE UNIDIRECTIONAL AND OR BIDIRECTIONAL REMOVAL OF A CLADDING LAYER OF AN OPTICAL PREFORM

(71) Applicant: j-plasma GmbH, Jena (DE)

(72) Inventors: Jörg Kötzing, Jena (DE); Robert Hanf, Eisenberg (DE); Lothar Brehm, Jena (DE)

(73) Assignee: j-plasma GmbH, Jena (DE)

( * ) Notice: Subject to any disclaimer, the term of this patent is extended or adjusted under 35 U.S.C. 154(b) by 0 days.

(21) Appl. No.: 14/921,136

(22) Filed: Oct. 23, 2015

(65) Prior Publication Data
US 2016/0115075 A1 Apr. 28, 2016

(30) Foreign Application Priority Data
Oct. 24, 2014 (DE) .................. 10 2014 115 534

(51) Int. Cl.
*C03C 25/68* (2006.01)
*G02B 6/028* (2006.01)

(52) U.S. Cl.
CPC .............. *C03C 25/68* (2013.01); *G02B 6/028* (2013.01)

(58) Field of Classification Search
None
See application file for complete search history.

(56) References Cited

U.S. PATENT DOCUMENTS

| 5,192,350 | A | 3/1993 | Le Sergent |
| 7,946,134 | B2 | 5/2011 | Atkins et al. |
| 9,002,162 | B2 * | 4/2015 | Alonzo ............ C03B 37/01262 385/34 |
| 2005/0031279 | A1 * | 2/2005 | Ishihara ........... C03B 37/01413 385/123 |
| 2006/0093290 | A1 * | 5/2006 | Fishteyn ................ C03C 25/68 385/115 |
| 2008/0028799 | A1 | 2/2008 | Kwon et al. |
| 2013/0251322 | A1 * | 9/2013 | Kitamura ................ G02B 6/02 385/123 |
| 2014/0107630 | A1 * | 4/2014 | Yeik ...................... G02B 6/001 606/5 |

FOREIGN PATENT DOCUMENTS

| EP | 1475358 | 11/2004 |
| JP | 58079835 | 5/1983 |
| JP | 62059545 | 3/1987 |
| JP | 01009831 | 1/1989 |
| JP | 04209729 | 7/1992 |
| JP | 2004-10368 | 1/2004 |
| JP | 2010-13352 | 1/2010 |
| WO | WO 03/052173 | 6/2003 |

OTHER PUBLICATIONS

Search Report from corresponding German Application No. 102014115534.3 dated May 19, 2015.

* cited by examiner

*Primary Examiner* — Shamim Ahmed

(74) *Attorney, Agent, or Firm* — Posternak Blankstein & Lund LLP

(57) ABSTRACT

The invention describes a method for the removal of glass where the parameters of the removal process are set over the length of the substrate (preform) so that a uniform removal can be achieved over the complete substrate length.

12 Claims, 1 Drawing Sheet

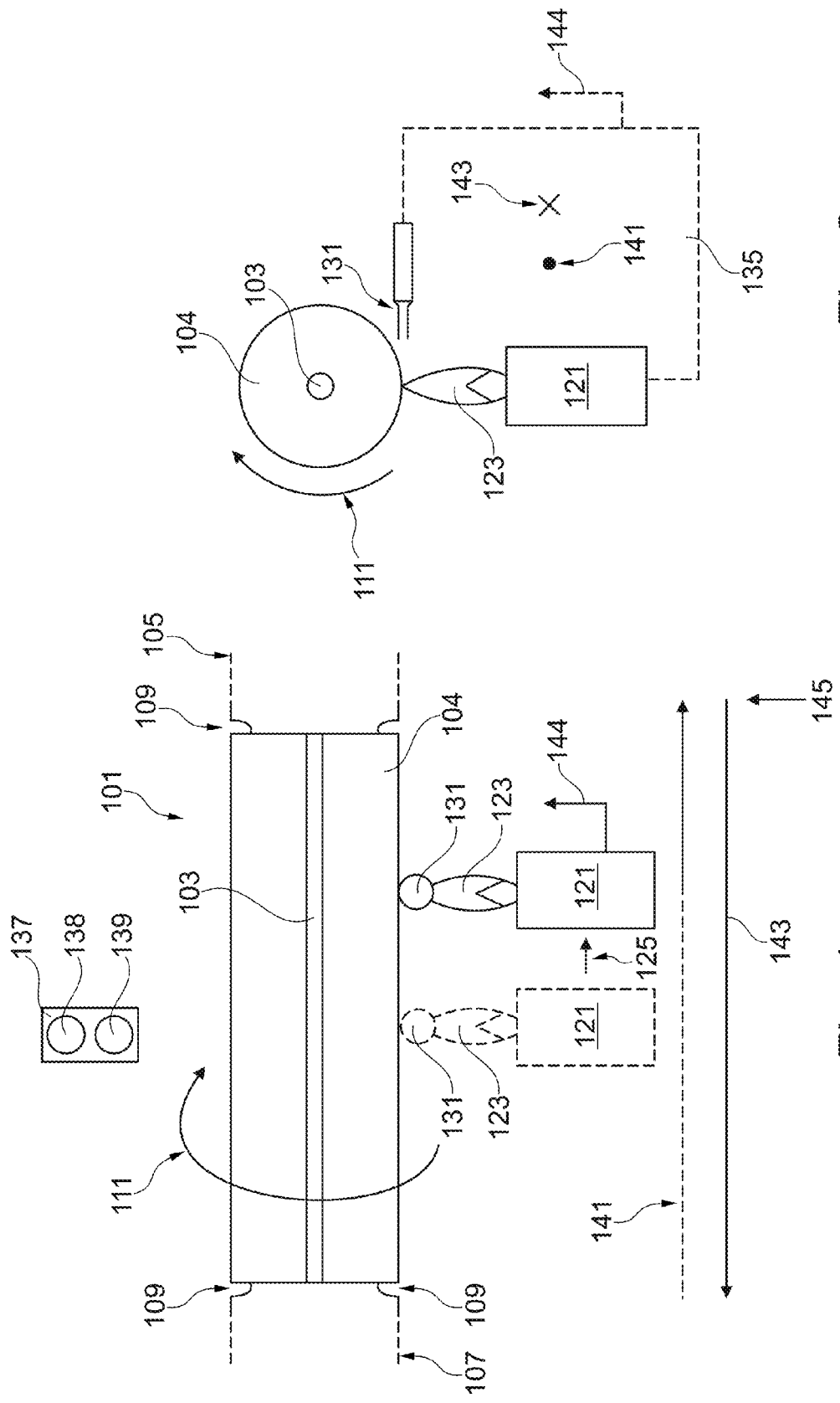

METHOD FOR THE UNIDIRECTIONAL AND OR BIDIRECTIONAL REMOVAL OF A CLADDING LAYER OF AN OPTICAL PREFORM

CROSS REFERENCE TO RELATED APPLICATIONS

This application claims the priority under 35 §119(a)-(d) of German Application No. 10 2014 115 534.3, filed on Oct. 24, 2014, the disclosure of which is hereby incorporated by reference.

STATEMENT REGARDING FEDERALLY SPONSORED RESEARCH OR DEVELOPMENT

N/A

FIELD OF THE INVENTION

The invention is related to a method for the bidirectional removal of a glass cladding layer of a preform, especially for the bidirectional removal of a glass cladding layer of a preform for optical fibers, by means of a removal device, such that the preform is shaped, wherein the removal device has a heating instrument and a translation instrument. The translation instrument causes the heating instrument and/or preform to translate with a relative translation velocity in a forward and backward direction. The heating instrument heats the preform to a temperature such that a bidirectional removal of the glass cladding layer is achieved.

BACKGROUND

Methods for the removal of glass are known from the state of the art. Different removal methods can be differentiated, e.g. mechanical, chemical and removal by heating.

A method for the removal of glass is described in JP58079835. The substrate is positioned in the inside of a tube and the space between substrate and tube is filled with an etching gas (consisting of helium and sulphur hexafluoride). From the outside of the tube energy is applied by means of an oxygen/hydrogen burner and the substrate with the etching gas is heated, so that material of the substrate is removed.

A similar method is described in JP62059545 whereby the aim of this invention is not to remove material but to remove contaminations. Therefore an etching gas is applied between the core rod and cladding tube to remove the contaminated outer layers of the core rod and the inner layers of the cladding tube. Subsequently the cladding is collapsed onto the core rod to yield a preform.

JP64009831 describes a method for the overcladding of substrates with a plasma burner, wherein the plasma burner is used in a preparation step to remove contaminations from the surface and therefore reduce the OH-content.

JP4209729 describes a method which removes material by a plasma burner and sets the amount of etching gas according to a diameter measuring device to yield a target diameter. The method is only used in one direction and uses a plasma burner with argon/oxygen mixture.

JP2010013352 describes a method for the removal of glass material from a preform surface prior to further processing. A layer with less than 0.3 mm is removed to minimize material loss.

US2008028799 describes a multi-step process for the removal of glass material. In a first step after the inside deposition by a MCVD (modified chemical vapor deposition) process the tube is etched on the inside to remove contaminations (especially OH). Afterwards the tube is collapsed to a rod. The contaminations of the surface with OH applied during deposition and collapsing are removed in a second process step either with a plasma flame or by wet chemical etching.

WO03052173 describes a method for a two-step etching of a glass tube. By a MCVD process layers are deposited on the inside of the glass tube which is partly collapsed afterwards. The resulting capillary is used for etching by applying an etching gas inside and heat produced by an oxygen/hydrogen burner on the outside. Within a first run the removal rate is maximized to optimize the process economy. The resulting contaminations with etching medium are removed in an additional etching run with a low concentration of etching medium to remove only a small amount of material.

JP2004010368 describes another method for the removal of contaminated glass layers.

In U.S. Pat. No. 7,946,134 a method for the production of preforms with large diameters is disclosed. This can be achieved by producing a very large core inside a substrate tube by a MCVD process. This bears the problem, that the substrate tube will become the inner cladding layers in the final preform. This is disadvantageous because usually an oxygen/hydrogen burner is used during MCVD, which causes OH-contaminations of the substrate tube. The proposed solution is to remove a large part or even the complete substrate tube. Now a cladding can be applied to the core which is not produced with oxygen/hydrogen flame. This improves the attenuation of the fibers drawn by such preforms.

EP1475358 describes a method for the removal of a substrate tube or the preform to reduce its ovality. This is achieved by controlled set-up of rotation and translation of the substrate and glass removal at specific positions. It is either possible to treat the substrate tube prior to deposition to carry out the MCVD process with a small formation of core ovality, or the cladding of preform with oval cores is treated in such a way, that the complete preform becomes oval but the layer thickness of the cladding material becomes equal at every position. During fiber drawing of the oval preform the drawing temperature is set to obtain circular fibers because of the surface tension.

In the methods known from the state of the art often only thin layers are removed to remove contaminations.

Furthermore in many cases the etching is performed inside a tube only in one direction. To obtain a maximized removal rate the etching should be carried out in both directions, which causes some problems.

By using a bidirectional removal process according to the state of the art especially the following disadvantages occur.

By the bi-directionality of the removal process in the area of the removal point an uneven temperature distribution occurs. This results in an inhomogeneous temperature distribution over the length of the preform (also called substrate). This inhomogeneous temperature distribution results in an inhomogeneous removal rate and a deviation of the preform from the target shape.

Furthermore the diameter of the preform cannot be measured accurately in the burner flame. This results in the problem that there is no possibility to control the process according to a target diameter. The diameter measurement is hindered especially by the radiation of the heating instrument, which emits electromagnetic radiation. Therefore the diameter measurement can only be carried out before or after the position where the burner heats the substrate.

To reduce the prior discussed uneven temperature distribution very long handling rods can be applied to the substrate. These handling rods are melted at the ends of the substrate and put in a glass working lathe to set the substrate/preform to rotate. Thereby the removal point can be displaced from the preform to the handling rods. This yields a removal of material of the handling rods which requires periodic renewal of the handling rods. Furthermore the etching time is enhanced and the economy of the process reduced.

Especially in the case in which the handling rod and the preform are made of different glass materials, a diameter neck at the connection might be formed. This is mainly based on differing viscosity of the different glass materials. When the preform is heated this might end in a local displacement at the connection point. This is compensated when the preform is cooled down but there might occur some material displacement, which reduces the quality of the resulting glass fiber.

Especially in the case in which a number of removal runs are necessary to yield the target shape of the preform, different amounts and therefore layer thicknesses have to be removed from the preform. The amount of glass material which can minimally be removed per run depends strongly on the diameter of the preform. It should be avoided to remove less than 0.3 mm for a cylindrical target with diameters of less than 30 mm, because this would result in relative translation speeds between burner and preform, which are so high, that the amount of glass removed per unit time becomes uneconomically small.

SUMMARY OF THE INVENTION

It is the task of this invention to improve the state of the art.

This is achieved by a method for the unidirectional and/or bidirectional removal of a cladding layer of a preform, especially a bidirectional removal of a glass cladding layer of a preform for a glass fiber, by means of a removal device to yield a target shape of the preform, wherein the removal device has a heating instrument and a kinematic instrument and the kinematic instrument sets the heating instrument and/or the preform to translate with a relative translation velocity in a removal forward direction and backward direction. The heating instrument heats the preform to a temperature so that a bidirectional removal of the glass cladding layer is achieved, wherein a first removal parameter is set depending on the position.

So a method is provided which achieves a uniform removal due to the locally dependent setting of the removal parameters. Furthermore a preform can be machined to yield arbitrary target shapes.

Additionally the handling rods used can be shorter than with the state of the art. Furthermore the degradation of the handling rods can be reduced as for example the power of the burner is reduced in the area of the handling rods or the amount of etching reagent is reduced. It can be omitted to place the removal point on the handling rods, but it can be set at the end of the preform. The limitation is set by the width of the burner flame.

By reducing the temperature of the burner at the end of the preform the displacement between preform and handling rod due to the diameter neck can by reduced or even prohibited. This results in no material displacement and an enhanced level of glass fiber quality along the complete length of the preform.

The core idea of the invention is based on the finding, that the removal is set depending on the position of the preform to achieve a better match with target values. This can be achieved by setting additional removal parameters. Especially by the combination of these different removal parameters and their position dependence the invention is carried out.

Some Definitions:

The term "bidirectional" describes that the burner passes every point besides the removal points one time from one side and one time from the other side. The first direction is named "removal forward pass" and the opposite direction is named "removal backward pass". Oftentimes forward and backward passes are performed consecutively after each other. If only the forward or backward pass is used in the following, this is to be understood as unidirectional.

The term "removal" is generally understood as a removal of material. This can in principle be a mechanical removal, wet-chemical removal and/or removal by heating. In the terms of this invention removal is always correlated to a heating process. This can be supplemented by mechanical and/or chemical removal.

The mechanical removal can be for example grinding, sawing or milling. The wet-chemical removal can be achieved by etching reagents like hydrofluoric acid.

The term "glass" is to be understood especially as quartz glass, although other glasses are included as well. Generally glass is an umbrella term for a group of amorphous solids which comprise mainly silica or silicates.

Naturally occurring and synthetic made glasses are included. Furthermore parts of the glass can be doped with dopants. Especially in case of quartz glass these dopants can be germanium, fluorine, phosphorous, aluminum, rare earths or others.

A "glass cladding layer" is a connected volume at the surface of the preform which can be removed. The complete optical cladding or parts of the optical core are included. Also horizontal and/or vertical parts of the optical cladding and/or optical core are subsumed under the term glass cladding layer. In general an arbitrary glass layer is meant.

The "preform" is generally labeled as a substrate too. The preform is a body made of glass which is to be put in a target form by the removal. To machine the preform particularly with a glass working lathe, the preform is formed like a cylinder or hollow cylinder. Even if the base area is oval shaped, it is still a cylinder in terms of this invention. Tube-like bodies are included as well.

The preform has a decreasing refractive index from the center radially outwards, which can be steady or stepwise. Oftentimes this preform is produced by chemical vapor deposition. The typical length of such preforms ranges from 0.8 to 2.8 meters and the diameter ranges from 10 to 350 mm. The preform comprises an optical core and a preform cladding (optical cladding) wherein the preform cladding can be collapsed onto the core or the core can be built by inside deposition. By drawing such preforms an optical fiber is produced. According to the field of application the core as well as the cladding can be doped.

The "removal device" includes all instruments which are necessary for the removal of the glass cladding from the preform. It especially includes a heating instrument. As a heating instrument, every heat source such as gas burners (oxygen/hydrogen or propane gas), electrical furnaces or plasma burners is included. The field of plasma burners includes inductively coupled plasma burners, microwave plasma burners, electrical arc burners or similar instruments. These heating instruments have the property to be able to heat the surface of the preform as well as the etching reagents, if necessary.

The removal device has a kinematic instrument to be able to remove at different positions along the preform. This "kinematic instrument" is especially suited to generate a translation with a relative velocity between the preform and the heating instrument in a removal forward direction and timely followed by the removal backward direction. The "switching" from forward to backward direction is carried out by the kinematic instrument at a reversal point.

The "target shape" is especially the shape which has to be built after the removal process of the preform is completed. For example a conical preform can have a target shape of a cylinder with constant diameter along the length.

A "relative translation" velocity is especially the velocity between the preform and the removal instrument, for example the heating instrument. It is possible that only the preform is moved relative to the heating instrument. On the other hand, it is possible that only the heating instrument is moved relative to the preform. A combination of the movement of the preform and the heating instrument is possible also.

The "process temperature" is defined as the temperature of the preform when the removal takes place. This process temperature can be varied. It is possible with respect to the concentration and/or composition of etching reagents to enhance or reduce the process temperature.

The processing of different positions along the length of the preform is summarized under the term "positional dependence".

The "first removal parameter" includes especially a parameter like temperature to control the removal.

In another embodiment the kinematic instrument rotates either the heating instrument or the preform with a relative rotational speed.

Thereby a uniform processing at one position can be achieved. The kinematic instrument according to the invention can include a glass working lathe.

The "relative rotational speed" can be calculated from the rotation of the heating instrument around the preform and/or the preform around a rotational axis, for example the rotational axis of a glass working lathe.

To use specific etching reagents for the removal process, the removal device can have a dosing unit to apply the etching reagents to the preform to remove, especially in combination with the heating, the glass cladding layer by the etching reagents or to support the removal. By adjusting the operation temperature and by changing the concentration of etching reagent there are two parameters for the bidirectional removal of the glass cladding layer. If different etching reagents are used, the number of removal parameters can further be increased.

By "etching reagent" any substance is included, which is directly usable for the glass removal, or can be converted to such substance by heating. Especially fluorinated compounds, e.g. $SiF_4$, $NF_3$, $CF_4$, $C_2F_6$, $SF_6$, $F_2$ are etching reagents. The choice of an appropriate etching reagent is done with respect to reactivity, availability in the necessary quality, the price and environmental aspects.

Furthermore the dosing unit is used to apply the etching reagent in the necessary concentration at the position of the removal. The dosing unit can comprise a single nozzle or multiple nozzles. These nozzles are controllable. The control of the nozzles can be done by setting different pressures or by setting the concentration of the etching reagent by a specific pressure.

In another embodiment the first or one of the other removal parameters is the relative translation velocity, the relative rotational speed, the concentration of one etching reagent and/or the operation temperature.

By the positional dependent influences and the positional dependent setting of the removal parameters alone or in combination the desired result can be achieved. For example the core of an optical waveguide might comprise undoped quartz glass. The corresponding cladding is quartz glass doped with fluorine. The complete fluorine doped layer has to be removed. So at both ends natural silica handling rods are connected and the preform is attached to a glass working lathe. Afterwards an inductively coupled plasma burner is ignited and moved relative to the preform. The preform is set to rotate to have a uniform radial removal rate. The power of the plasma burner and therefore the first removal parameter is set, so that the power increases along the length of the preform. At the connection point of the preform and handling rod, the power of the burner is reduced. After the direction is changed the power is enhanced again from the beginning to the end of the preform. A symmetrical burner power curve is used for the forward and backward run. This yields a uniform removal and a uniform diameter.

One embodiment for the combined setting of different removal parameters can be as follows.

A steady power increase along the length of the substrate cannot result in uniform material removal. This is based on the fact that at the ends of the preform, where the highest power is applied, the cooling time is relatively low because the heating instrument passes this position after the direction change faster than the middle.

In order not to use a very long handling rod and passing the heating instrument for a long time over this handling rod in order to cool the beginning part of the preform sufficiently, the relative translation speed of the heating instrument in the region of the end parts can be enhanced or the power of the heating instrument reduced.

Additionally the concentration of etching reagent which is usually constant along the complete substrate length can be reduced to minimize material removal.

A reduction of the operation temperature has the further advantage that the handling rods are subjected to a low material removal and therefore can be reused often.

To set the removal parameters depending on the position, the preform can be measured prior to or during the removal process by a measuring device, so that especially the original dimension and the actual dimension are known.

Due to the extremely difficult circumstances inside the burner flame no direct measurement can be carried out and therefore no direct control can be applied. But because of the knowledge of the bidirectional removal at a later position of the preform, the dimension can be measured at that position and the removal parameters can be set and a control can be carried out.

The "measuring instrument" is especially an optical measuring device which measures the dimension of the preform. This can be performed by a camera system with reference or by a laser based measuring device. Laser scanners which detect the edges of the preform by a beam and detector array have proven useful. A laser scanner LDM-304 from LAP was used in this embodiment.

Additionally or alternatively in one embodiment during the removal, the position dependent temperature of the preform can be measured by a temperature measuring device.

This is also not performed at the actual position of the removal but before or after that position. But due to the bidirectionality of the removal it is ensured, that the removal takes place to at a later time at the measured position.

Based on the information of the temperature at that position the temperature of the heating instrument, especially at the reversal points, can be reduced in order to achieve the target temperature at that position. The temperature measurement can be performed optically. For example a calibrated infrared camera can be used. This might be a PYROVIEW 380G from DIAS Infrared Systems.

To use the measured values of dimension and/or temperature in an optimal manner, a control for the removal by adjusting one or more removal parameters can be implemented, wherein the position dependent temperature and/or dimension are the actual value.

Therefore a removal process can be implemented which carries out an optimized removal based on current conditions. PID- or Fuzzy controllers are used for this purpose.

The target value is a value of the single removal parameter or their combination.

By this embodiment there is no need for a human observer to control the process.

In another embodiment the bidirectional removal is performed with at least two removal passes, wherein in each removal pass the relative translational speed is less than a maximum relative translation speed.

This ensures that the amount of removed glass per unit time is optimal.

By such an embodiment the layer to be removed and the glass cladding layer to be removed are removed by a specific number of removal passes. The removal parameters are set such that the number of passes is minimized.

Therefore it is especially important that in each pass the removed layer has a thickness of at least 0.3 mm (if the substrate has a diameter of less than 30 mm). The thicker the layers to be removed the lower the relative translation speed and the higher the efficiency of the process.

The removal of layers with less than 0.3 mm results in high relative translation speeds and an uneconomically small amount of removed glass material.

According to the invention it was found out that the concrete value of the layer thickness to be removed always has to be seen with respect to the substrate diameter, because the amount of glass material to be removed increases with increasing substrate diameter. Therefore the minimum amount of glass material removal is defined by the difference $\Delta$ of the cross section areas (CSA). One mathematical description is:

$$\Delta CSA = (A_{ds}/2)^2 - (A_{de}/2)^2$$

With $A_{ds}$ being a starting diameter and $A_{de}$ being the end diameter after one removal pass.

With respect to a substrate diameter of 22 mm this yields a minimum CSA difference of 10 mm$^2$ with a minimum removed layer thickness of 0.3 mm. A CSA difference of 20 mm$^2$ is more preferred, and 25 mm$^2$ is still more preferred. This results in economical removal processes.

If the parameters of the removal process are set such that a removal of 30 mm$^2$ is achieved and the overall removal has to be 155 mm$^2$, after 5 passes only 5 mm$^2$ material are to be removed. This removal pass would have to be performed with a high relative translational speed which would not be economical.

Therefore in an improvement of the described embodiments a control is implemented which calculates the overall CSA difference and sets the removal process parameters so that at least 10 mm$^2$ are removed in each pass.

The control can alternatively be performed based on the diameter differences wherein different values are set for different preform diameters. Furthermore the control can not only be carried out by using existing parameter values, which were obtained by calibration, but the control registers the removed material amount permanently and adds these data to a database and can use a permanently increasing data volume for its removal parameter calculation. By this means changes in the effectiveness of the removal process, e.g. by changes of the heating instrument or other process parameters, are included and the removal device works in a self-calibrating manner.

This increases reliability of the removal because of a fully automated control and the economy because thick layers are always removed and because there is no need for personnel to permanently control the removal process and set the parameters manually.

In general the invention is related to the removal of glass by a heating instrument and heating of the surface of a preform. Each of the disclosed inventive methods can be combined with other removal processes known from the state of the art (mechanical or wet-chemical).

In a further aspect, the problem is solved by a preform of a glass fiber which is provided by carrying out the previously described process, and in particular where the preform is layered and/or is pulled to a glass fiber.

In this way, a glass preform can be prepared with defined structural and material properties.

DESCRIPTION OF THE DRAWINGS

The invention is described in light of some embodiments in which:

FIG. 1 shows a schematic representation of the removal process of a preform with a plasma burner and a supplied etching reagent in a side view.

FIG. 2 shows a schematic representation of the method in 90° rotated view with respect to FIG. 1.

DETAILED DESCRIPTION OF THE INVENTION

A preform 101 comprises an undoped core 103, a cladding 104 which comprises the substrate tube after the inside deposition and the collapsing step. At the ends of the preform 101 are handling rods 105, 107 made of natural quartz glass. Due to the different viscosities of the handling rods 105, 107 and the preform 101 there is a neck 109 at the connection.

The handling rods 105, 107 are mounted in a glass working lathe (not depicted). The glass working lathe sets the handling rods 105, 107 and therefore the connected preform 101 into rotation in rotation direction 111.

Furthermore the glass working lathe has a controllable translation device (not shown) which comprises a plasma burner 121 and etching reagent nozzle 131 mounted on a translation stage 135. The translation stage 135 is moveable along a removal forward pass 141 and removal backward pass 143.

The plasma burner 121 is an inductively coupled plasma burner. The etching reagent nozzle 131 is constructed so that etching reagent flowing through the nozzle 131 is sprayed into the tip of the burner flame 123 of the plasma burner 121. By controlled movement of the translation stage 135 in removal forward and backward pass in translation direction 144 the removal positions along the preform 101 are set.

Additionally the glass working lathe has a sensor unit 137 with a temperature sensor 138 and a diameter sensor 139. The sensor unit 137 is mounted on a translation stage which is independent of the translation stage 135.

The removal process is used to remove the cladding 104 of the preform 101.

Therefore the translation stage 135 is moved to the connection point between handling rod 107 and first end of the preform 101. Furthermore the plasma burner 121 is ignited so that the highest temperature of the burner flame 123 is applied to the surface of the preform. Afterwards the translation stage is moved in removal forward pass 141. If the burner flame 123 and the etching reagent nozzle 131 reach the preform 101, the etching reagent comprising 50% $SiF_4$ and 50% $NF_3$ is applied to the tip of the burner flame 123 and therefore to the surface of the preform 101.

Due to the resulting heat on the surface of the preform and the effect of the etching reagent, glass material removal results.

The translation stage is continuously moved in removal forward direction 141. Therefore the plasma burner 121 is moved as well. Prior to the reversal point 145 the power of the plasma burner 121 is reduced to prevent a sinking of the preform 101 because of the neck. In contrast, the amount of etching reagents is increased by increasing the pressure at the nozzle 131.

Additionally or alternatively the sensor unit 137 is updated to measure the diameter and the temperature of the just etched area of the preform 101 by the temperature sensor 138 and the dimension sensor 139. Based on the measured temperatures and diameters the power of the plasma burner 121 and the amount of etching reagents is reduced at the reversal point 145 and increased continuously until close to the reversal point in removal backward pass 143.

The sensor unit 137 is moved in a way to follow the plasma burner 121 and calculate the next set of removal parameters at the next reversal point.

The Fuzzy-control includes the empirically determined temperature change until the moment when the plasma flame reaches areas measured before.

Both the removal forward pass 141 and removal backward pass 143 are run multiple times and the translation stage 135 is moved in translation direction 144 to yield the target shape after multiple removal passes.

In another embodiment the preform 101, in which an undoped cladding layer results from the substrate tube of a prior inside deposition process for the production of the doped core layer, is connected to handling rods and mounted on a glass working lathe. But in this case the plasma burner is fixed and the preform is moved by the kinematic device of the glass working lathe above the plasma burner. In this case, only $SF_6$ is used as etching reagent.

The cladding is partly removed before the preform is further machined in additional process steps. After the partial removal of the first cladding layer a second cladding layer which is doped is applied to the preform.

For this process a fluorine doping is used. This results in an optimized waveguiding property of the fiber even when the fiber is bent. The deposition of the second cladding layer might be followed by further outside deposition steps which are applicable to deposit further cladding layers. By this method complex refractive index profiles within the cladding region can be produced.

The deposition of further cladding layers can alternatively be carried out by collapsing tubes onto the preform. A combination of the prior described control technique is used optionally to control the (partial) removal of the first cladding layer and the deposition of further cladding layers and switching from the removal stage to the deposition stage if predetermined criteria are met. If the process ends up at the target outer diameter it can finish automatically.

In another embodiment the cladding layers are removed completely and a part of the core layer is removed as well. In particular, when the doped core is produced by an inside deposition process, the outer core layers can be contaminated. This is caused by diffusion processes from the substrate tube into the core layers. Furthermore it might be necessary from process requirements to produce the first layers with modified parameters to have a steady adjustment of glass parameter (viscosity, mechanical tensions, refractive index, dopant concentrations). In these cases the outer core layers have different properties than the inside of the core.

If cores with radially homogenous properties are necessary the outer core layers have to be removed. So according to the inventive concept first the cladding layers are completely removed and afterwards further removal passes are carried out, to remove as much core layers as necessary to achieve the desired homogeneity of the properties. This is followed by further process steps to deposit one or more cladding layers.

In an alternative embodiment the preform is not a compact rod but a tube (hollow cylinder). This tube is connected with tubes as handling means, since there has to be a pressure compensation during the heating steps with the environment on at least one side.

Depending on the geometrical parameters of the tube before or at the end of the removal process it can be determined which supplemental measures have to be undertaken to prevent the tube from collapsing during the removal process. If the application in insensitive against collapsing or collapsing is even preferred, these supplemental measures can be omitted.

Supplemental measures are pressure control units which have effect in the inside of the tube or outside or in combination. If a collapsing is expected, excess pressure is applied to the tube inside to prevent collapsing. If collapsing is desired, a partial vacuum can be applied.

These effects can also be achieved if the excess pressure or partial vacuum is applied outside of the tube. The pressure difference between the tube inside and the region outside of the tube is important. If the wall thickness of the tube is very small, pressure control units have severe problems, because the excess pressure to prevent the tube from collapsing is too high. In such cases a supplemental rod is inserted into the inside of the tube which stabilizes the geometry after a controlled collapsing of the tube onto the supplemental rod.

Supplemental rods are made of heat-resistant materials. It has proven useful to use materials with higher coefficients of thermal expansion than the tube so that after the cooling the supplemental rod can be removed from the tube.

The removal steps during the processing of tubes are the same as for preforms. The tubes are usually further processed after the removal process. Especially outside depositions, inside depositions or collapsing steps are performed.

An etching medium is used inside of the tube, since due to the heating of the tube for the removal process, there are contaminations on the inside of the tube which are removed either permanently or at the end of the removal process. The etching medium is applied by the pressure control unit.

In another embodiment the position dependent setting of the removal amount is used to settle geometry faults of the preform. In common techniques of glass processing waviness can be produced. This waviness causes the fiber diameter to deviate during fiber drawing or causes an immense control effort during drawing.

With the inventive method such preforms can be processed prior to drawing, so that the geometric properties match the tolerances. For a preform with waviness the removal rate is set to be position dependent, which is adjusted to correct or even eliminate the waviness.

This is done by setting the amount of etching reagent, burner power and translation speed accordingly.

Preforms having an ovality are not only treated as positional dependent, but also as rotational dependent to reduce or eliminate the ovality.

If a preform has a conical geometry the removal parameters are set as positional dependent such that the conicity is reduced or eliminated.

On the other hand for some applications it is even preferred to shape a preform with a constant diameter conical. This might be necessary if the core of the preform has a conical shape because the ratio of cladding to core has to be constant along the complete preform length. This can be achieved with the inventive concept also.

REFERENCE PART LIST 101 preform
103 undoped core
104 doped cladding
105 first handling rod
107 second handling rod
109 neck
111 rotating direction of the preform
121 plasma burner
123 burner flame
125 burner direction
131 etching reagent nozzle
135 translation stage
137 sensor unit
138 temperature sensor
139 dimension sensor
141 removal forward pass
143 removal backward pass
144 translation direction
145 reversal point

What is claimed is:

1. A method for the bidirectional removal of a glass cladding layer of a preform by a removal device, the method comprising:
providing a removal device comprising a heating device and a kinematic device, wherein the kinematic device is operative to set one or both of the heating device and the preform to translate in a direction along a length of the preform with a relative translation speed in a removal forward pass and a removal backward pass, and the heating device is operative to subject the preform to an operating temperature at which removal of the glass cladding layer takes place;
setting a first removal parameter to be dependent on a position along the length of the preform; and
processing the preform to a target shape.

2. The method of claim 1, further comprising setting a further removal parameter.

3. The method of claim 1, further comprising rotating one or both of the heating device and the preform during the step of processing the preform to a target shape.

4. The method of claim 1, further comprising applying one or more etching reagents to the preform during the step of processing the preform to a target shape, to remove the glass cladding layer or to support removal of the glass cladding layer by the heating device.

5. The method of claim 1, the first removal parameter comprises a relative translation speed, a relative rotation speed, a concentration of an etching reagent, or an operating temperature.

6. The method of claim 1, further comprising measuring a dimension of the preform prior to the step of processing the preform to the target shape before beginning the removal process to determine an original dimension of the preform.

7. The method of claim 6, wherein the original dimension is a diameter of the preform.

8. The method of claim 1, further comprising measuring a dimension of the preform during the step of processing the preform to the target shape to determine an actual dimension of the preform at a position along the length of the preform.

9. The method of claim 8, wherein the actual dimension is a diameter of the preform.

10. The method of claim 9, further comprising measuring a temperature of the preform at the position along the length of the preform at which the actual dimension is measured.

11. The method of claim 10, wherein the first removal parameter is set based on one or both of a predetermined position dependent temperature and position dependent dimension of the preform.

12. The method of claim 1, further comprising performing at least two removal passes, wherein in each removal pass the relative translation speed is less than a maximum translation speed of the removal device with respect to the preform.

* * * * *